A01B 41/06

United States Patent
Stelzle et al.

Patent Number: 6,134,494
Date of Patent: Oct. 17, 2000

[54] AUTOMATIC POWER TAKEOFF CONTROL SYSTEM

[75] Inventors: Michael Stelzle, Aurora; William L. Schubert, Downers Grove; William A. Itzenhuiser, Naperville, all of Ill.

[73] Assignee: Case Corporation, Racine, Wis.

[21] Appl. No.: 09/415,245

[22] Filed: Oct. 6, 1999

Related U.S. Application Data

[63] Continuation-in-part of application No. 09/294,868, Apr. 20, 1999.

[51] Int. Cl.$^7$ .................................................. A01B 41/06
[52] U.S. Cl. .................................. 701/50; 701/69; 172/2; 172/3; 477/111; 477/107; 74/15.86; 74/15.63; 74/11; 180/53.6; 180/53.7
[58] Field of Search ........................ 701/50, 69; 74/15.86, 74/15.8, 15.63, 11; 180/53.6, 53.62, 53.61, 53.7; 477/111, 107; 172/2, 3, 35

[56] References Cited

U.S. PATENT DOCUMENTS

| | | | |
|---|---|---|---|
| 4,503,916 | 3/1985 | Wiegardt | 172/3 |
| 4,715,012 | 12/1987 | Mueller, Jr. | |
| 4,817,499 | 4/1989 | Bellanger et al. | 91/361 |
| 4,822,962 | 4/1989 | MacCourt | 200/61.88 |
| 4,837,691 | 6/1989 | Boe et al. | 701/50 |
| 4,907,493 | 3/1990 | Bellanger et al. | 91/361 |
| 4,909,331 | 3/1990 | Defranco | 172/4 |
| 4,920,813 | 5/1990 | Willford | 74/11 |
| 4,969,527 | 11/1990 | Boe et al. | 172/7 |
| 4,979,092 | 12/1990 | Bergene et al. | 364/148.01 |
| 5,070,982 | 12/1991 | Pitchford | 192/69.9 |
| 5,186,271 | 2/1993 | McLean | 180/14.4 |
| 5,421,416 | 6/1995 | Orbach et al. | 172/4 |
| 5,469,921 | 11/1995 | Orbach et al. | 172/4 |
| 5,549,166 | 8/1996 | Orbach et al. | 172/4 |
| 5,558,163 | 9/1996 | Hollstein | 172/2 |
| 5,592,029 | 1/1997 | Hollstein et al. | 307/9.1 |
| 5,611,751 | 3/1997 | Ehrenhardt et al. | 477/73 |
| 5,740,044 | 4/1998 | Ehrenhardt et al. | 701/87 |
| 5,911,769 | 6/1999 | Orbach et al. | 701/50 |
| 6,041,867 | 3/2000 | Orbach et al. | 172/2 |

*Primary Examiner*—William A. Cuchlinski, Jr.
*Assistant Examiner*—Olga Hernandez
*Attorney, Agent, or Firm*—Foley & Lardner

[57] ABSTRACT

A method of automatically controlling a power takeoff shaft of a work vehicle having a hitch includes automatically initiating engagement of the power takeoff shaft as the hitch is lowered such that the power takeoff shaft reaches clutch lockup approximately at a predetermined hitch position setpoint. A method of controlling the engagement of a power takeoff shaft of a work vehicle having a hitch includes calculating a hitch drop time from a first hitch position to a second hitch position based on a hitch drop rate, comparing the hitch drop time to a power takeoff shaft engagement time, and decreasing the hitch drop rate if the power takeoff shaft engagement time is greater than the hitch drop time.

40 Claims, 6 Drawing Sheets

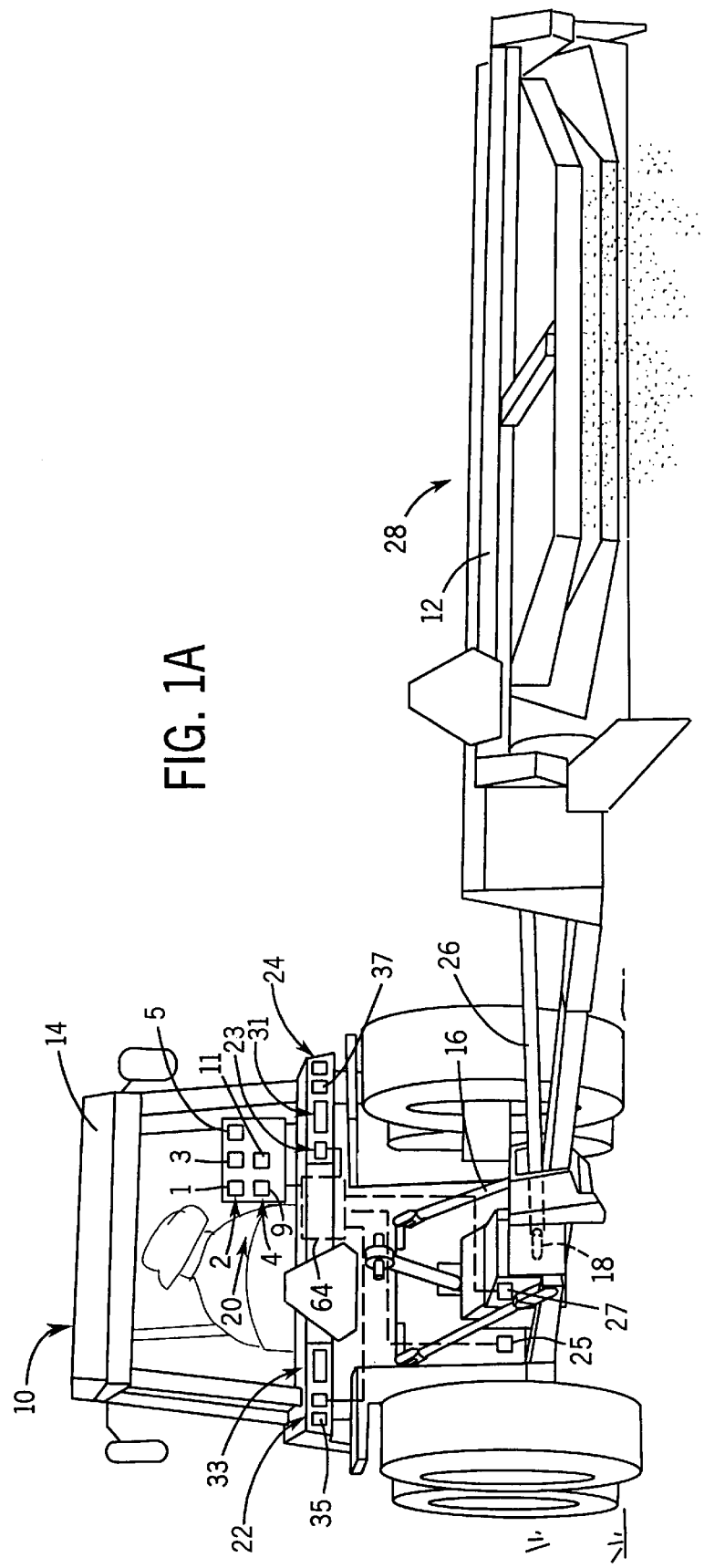

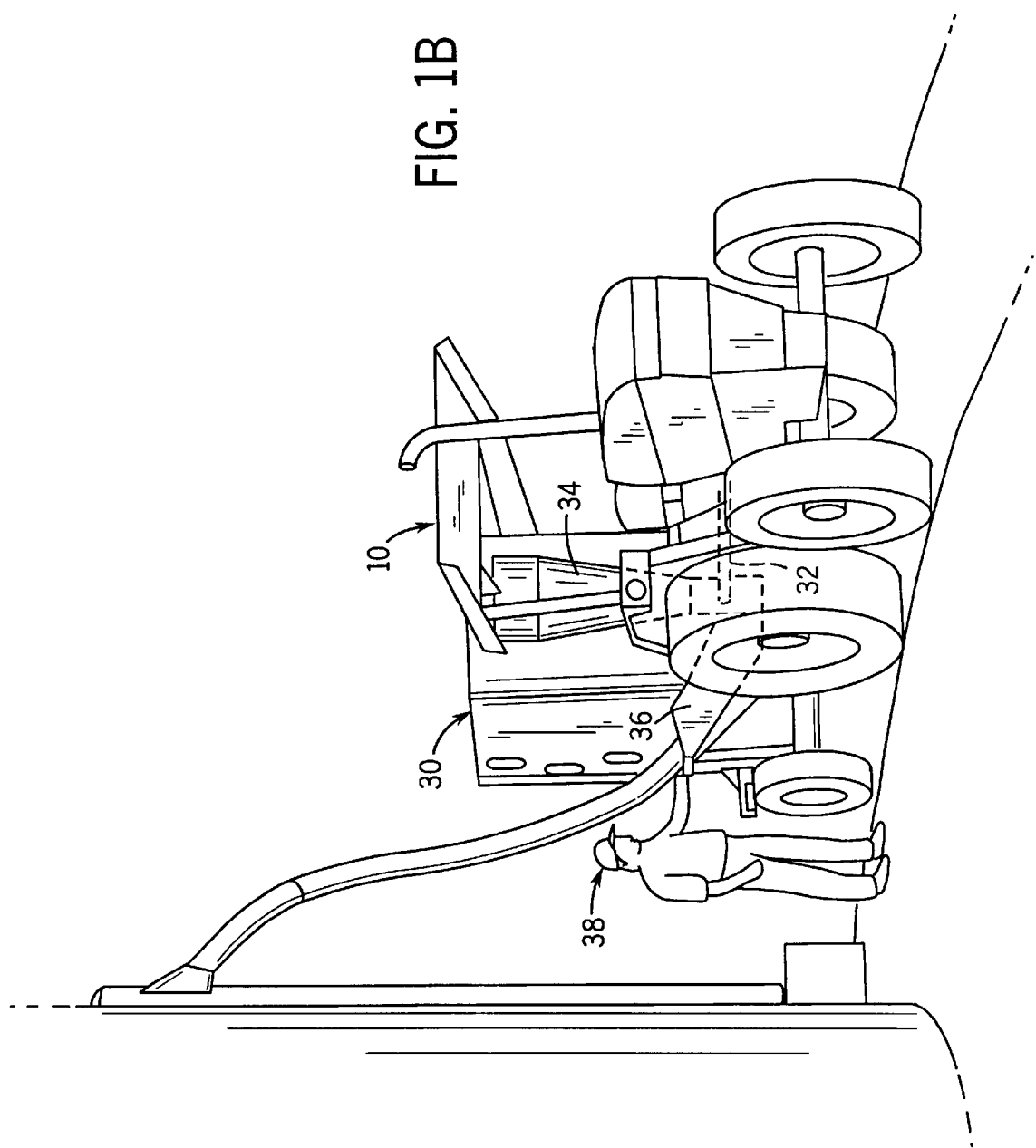

AUTOMATIC POWER TAKEOFF CONTROL SYSTEM

CROSS-REFERENCE TO RELATED APPLICATION

This application is a continuation-in-part of U.S. patent application Ser. No. 09/294,868, that is pending and is entitled "Power Takeoff Control System", filed on Apr. 20, 1999 by Stelzle et al.

FIELD OF THE INVENTION

The present invention relates generally to control systems for engagement and disengagement of a power takeoff. More specifically, the present invention relates to control systems for engagement and disengagement of a power takeoff shaft of a work vehicle such as a tractor.

BACKGROUND OF THE INVENTION

Many work vehicles (e.g., agricultural vehicles such as tractors; construction vehicles such as skid-steers) in use today include at least one power takeoff (PTO) shaft. A PTO shaft allows the farmer to operate implements and other farm machinery using power provided by the tractor engine. Common PTO-driven implements include balers, mowers, grinder mixers, augers, drills, etc. Some of these implements are driven while the tractor travels across a field (e.g., balers and mowers) while others are driven while the tractor is stationary (e.g., augers, drills, blowers, feeders, grinders and manure pumps). Still others may be driven while the tractor is either stationary or traveling (e.g., grinder mixers).

Ease of operator use and flexibility of controls are important considerations when designing an operator control system for PTOs. In some prior systems, a control switch has been provided in the operator station (e.g., cab or platform) of the work vehicle to allow the operator to engage and disengage the PTO shaft to the engine of the work vehicle. These operator station-mounted switches are useful for applications where the tractor is in motion since the operator is typically in the operator station while farming. However, when an auger or drill is driven by the PTO shaft, the operator must continuously walk back to the operator station to turn the PTO shaft on and off using the operator station-mounted switch.

Accordingly, remote switches have been mounted at various locations around the work vehicle (e.g., on the front or rear fender of the vehicle) to allow the operator to control the PTO from outside the operator station of the work vehicle. Various control systems have been introduced to determine when the remote switch is active and when the operator station-mounted switch is active. For example, in one prior system, a selector switch is provided in the operator station to select between a standard mode (operator station-mounted switch active) and a remote mode (fender-mounted switch active). One drawback of this control system occurs when the operator wishes to switch from remote mode back to standard mode. The operator must actively switch the system from the remote mode to the standard mode when the operator enters the vehicle and begins farming the field with a PTO-driven implement. If the operator forgets to actuate this selector switch, the remote switch is still active. Thus, a stray twig, stalk or other obstruction may actuate the remote switch, turning the remote PTO on or off unbeknownst to the operator, causing operator confusion. The operator may also travel some distance before realizing this error, requiring the operator to re-farm the missed portion of the field, wasting valuable time and resources.

Farm equipment manufacturers are beginning to realize the advantages of automating certain controls on the work vehicle. For example, when the work vehicle reaches the end of a row in the field (i.e., the headland), the operator must perform several tasks at once, including such things as turning the PTO shaft off, raising the hitch which is coupled to the implement, disabling mechanical front-wheel drive (MFD), disabling differential lock (DL), etc. Then, as the tractor re-enters the field after turning around on the headland, the operator must perform the opposite of these same tasks. Thus, attempts have been made in the prior art to automate one or more of these tasks performed when the work vehicle reaches the headland. Additional functionality and flexibility is demanded by operators to allow them to customize this automation procedure for various farming processes.

Accordingly, what is needed is an improved control system for a PTO having remote switches which improves the ease of use of the remote switches without significantly affecting operability or functionality. Also what is needed is a system to add new functionality and flexibility to the automation of PTO control when the work vehicle reaches and turns around on the headland.

SUMMARY OF THE INVENTION

One embodiment of the invention relates to a method of automatically controlling a power takeoff shaft of a work vehicle having a hitch. The method includes automatically initiating engagement of the power takeoff shaft as the hitch is lowered such that the power takeoff shaft reaches clutch lockup approximately at a predetermined hitch position setpoint.

Another embodiment of the invention relates to a method of controlling the engagement of a power takeoff shaft of a work vehicle having a hitch. The method includes generating a hitch position setpoint; generating a first time period representative of the power takeoff shaft engagement time; generating a hitch drop rate; and automatically initiating engagement of the power takeoff shaft based on the hitch position setpoint, the hitch drop rate and the first time period such that the power takeoff shaft achieves clutch lockup approximately at the hitch position setpoint.

Another embodiment of the invention relates to a control system for controlling the engagement of a power takeoff shaft of a work vehicle having a hitch. The control system includes a power takeoff shaft sensor and a control circuit coupled to the power takeoff shaft sensor. The control circuit is configured to generate a default power takeoff shaft engagement time, to initiate engagement of the power takeoff shaft, to measure a time period representing the time between initiating engagement of the power takeoff shaft and clutch lockup, and to generate a new power takeoff shaft engagement time based on the time period.

Another embodiment of the invention relates to a method of controlling the engagement of a power takeoff shaft of a work vehicle having a hitch. The method includes calculating a hitch drop time from a first hitch position to a second hitch position based on a hitch drop rate; comparing the hitch drop time to a power takeoff shaft engagement time; and decreasing the hitch drop rate if the power takeoff shaft engagement time is greater than the hitch drop time.

BRIEF DESCRIPTION OF THE DRAWINGS

The invention will become more fully understood from the following detailed description, taken in conjunction with the accompanying drawings, wherein like reference numerals refer to like parts, and in which:

FIGS. 1A–1B are diagrams of a tractor having a PTO shaft capable of driving implements while traveling (FIG. 1A) and while stationary (FIG. 1B) according to an exemplary embodiment of the present invention;

DETAILED DESCRIPTION OF THE PREFERRED EMBODIMENTS

Figure 2:
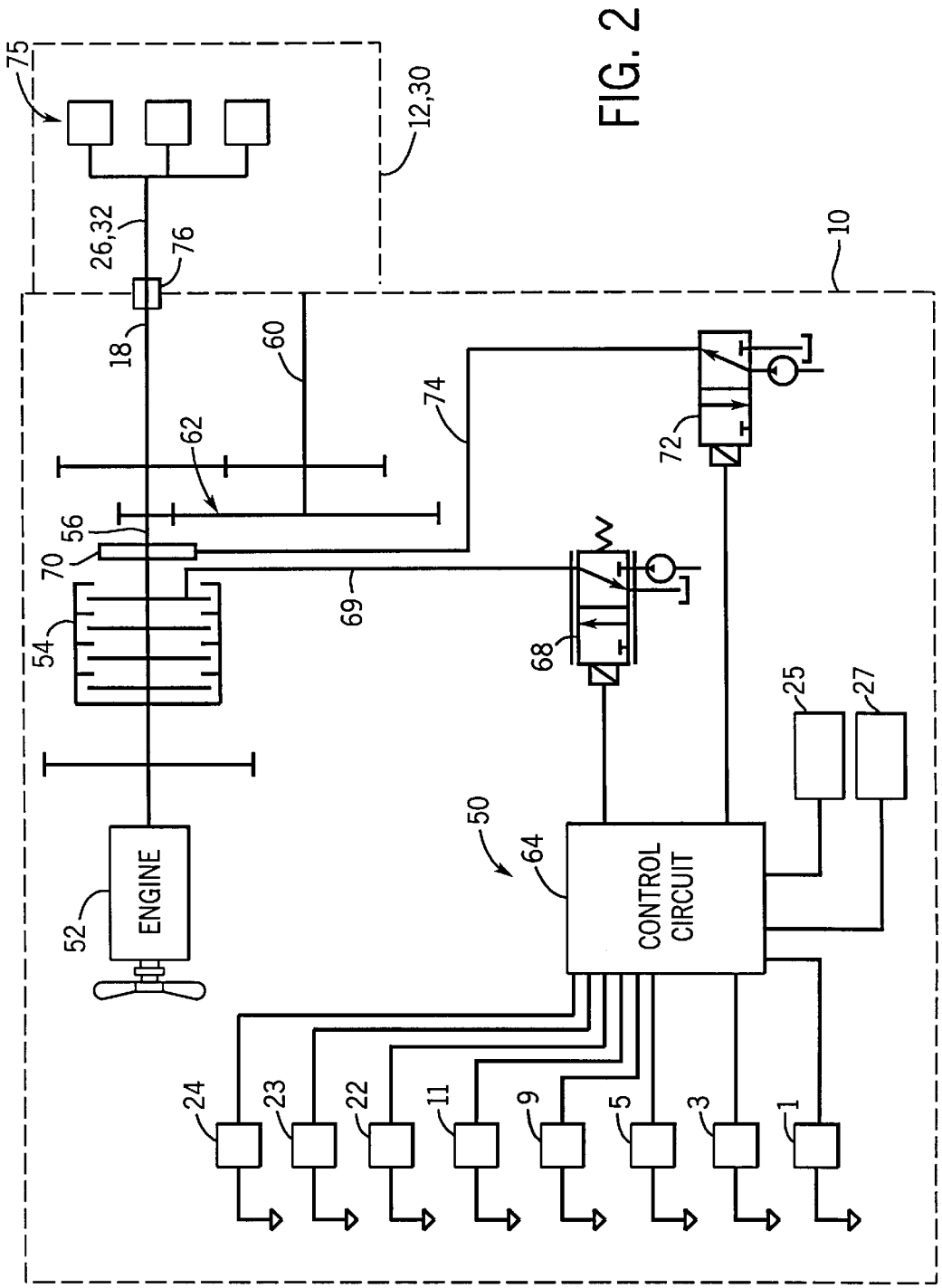
FIG. 2 is a block diagram of the control system for the tractor and implement of FIGS. 1A and 1B according to an exemplary embodiment of the present invention.

Referring to FIG. 1A, a work vehicle 10 is shown pulling an implement 12. Work vehicle 10 may be any type of agricultural or construction vehicle, such as, a Case Model 4240 tractor. Implement 12 may be any type of implement, such as, a rotary harrow, for example, a Lelyterra 35/45-series rotary harrow. Vehicle 10 includes an operator station 14, a hitch 16 and a power takeoff (PTO) shaft 18. Vehicle 10 further includes a control unit 64 coupled to a pair of remote PTO control switches 22, 24, a remote hitch control switch 23, a vehicle speed sensor 25, a hitch position sensor 27 and an operator interface unit 20. The positioning of switches 22, 23 and 24 is selected to allow a direct view of a drive shaft 26 of implement 12 by an operator standing behind vehicle 10 using switches 22, 23 and 24. In one embodiment, remote PTO switches 22 and 24 are located outboard of rear brake lights 31, 33 on left and right fenders 35. Remote hitch control switch 23 is located inboard of rear brake light 31. A second remote hitch control switch can be similarly located inboard of brake light 33. Operator interface unit 20 includes PTO control switches 2 and hitch control switches 4. PTO control switches 2 include an operator station-mounted PTO ON/OFF control switch 1, a PTO remote/local selector switch 3 and an auto PTO mode switch 5. Hitch control switches 4 include a hitch position command switch 9 and a hitch UP/DOWN switch 11.

Implement 12 is coupled to vehicle 10 at hitch 16 and further includes a drive shaft 26 and a driven member 28. Hitch 16 may be, for example, a three-position hitch such as that shown in commonly assigned U.S. Pat. No. 5,421,416 to Orbach et al. entitled "Hitch Assembly Control System" or commonly assigned U.S. Pat. No. 5,601,146 to Schlegel et al. entitled "Hitch Assembly for a Tractor," both patents hereby incorporated by reference. In this embodiment, driven member 28 is a blade for a mower. PTO shaft 18 is engaged to the engine (not shown) of vehicle 10 in response to control signals from control circuit 64. In response, PTO shaft 18 begins rotating at, for example, 540 or 1000 rotations per minute, driving at 40 to 150 horsepower or more. Since PTO shaft 18 is coupled to drive shaft 26 which is itself coupled to driven member 28, as vehicle 10 traverses an agricultural field, the engine of vehicle 10 provides the necessary power to drive the driven member 28 to thereby work a field. According to one advantageous feature of the present invention, while vehicle 10 is travelling, remote PTO control switches 22, 24 are disabled to prevent inadvertent actuations as described hereinafter.

Referring now to FIG. 1B, vehicle 10 is shown coupled to a second implement 30. Second implement 30 is, for example, a Case Model 1260 grinder-mixer. Implement 30, like implement 12, includes a drive shaft 32 and one or more driven members 34, 36 (e.g., a hammermill, an auger feeder, etc). Again, since PTO shaft 18 is coupled to drive shaft 32 which is itself selectively coupled to one or more of driven members 34, 36, the engine of vehicle 10 provides the necessary power to drive driven members 34, 36 for loading, grinding, mixing, and unloading feed or other product. In this embodiment, vehicle 10 is stationary while driven members 34, 36 of implement 30 are driven. Accordingly, an operator 38 standing outside vehicle 10 uses remote PTO switches 22, 24 (see FIG. 1A) for convenience to engage and disengage PTO shaft 18.

Referring to FIG. 2, a PTO control system 50 for vehicle 10 is shown. One example of a PTO control system is disclosed in commonly assigned application Ser. No. 09/262,713, filed Mar. 4, 1999, entitled "Power Take Off Engagement Control System", which is hereby incorporated by reference. An engine 52 provides power to the drive wheels (not shown) of vehicle 10 and, in addition, provides power to apply rotational motion to a multi-plate, hydraulically-actuated PTO clutch 54. An output shaft 56 of clutch 54 is shown directly coupled to a 1000 RPM PTO (high speed PTO) shaft 18 and optionally coupled to a 540 RPM PTO (low speed PTO) shaft 60 by a reduction gear 62. In the embodiment shown, PTO shaft 18 is used to drive the implement. In alternative embodiments, PTO shaft 60 could drive the implement, or other PTO speeds may be used.

Control system 50 includes a control circuit 64 (e.g., including one or more digital microprocessors such as an Intel TN83C51FA microprocessor or other digital or analog circuitry, a memory, inputs/outputs, etc.) coupled to operator station-mounted PTO ON/OFF control switch 1, PTO remote/local selector switch 3, auto PTO mode switch 5, hitch position command switch 9, hitch UP/DOWN switch 11, remote PTO control switches 22, 24, remote hitch control switch 23, vehicle speed sensor 25, hitch position sensor 27 and a hydraulic clutch control valve 68. Vehicle speed sensor 25 includes a ground speed radar, but may alternatively include a transmission output speed sensor which counts the teeth in a ring gear of the transmission of vehicle 10 to determine if the vehicle is moving. Vehicle speed sensor 25 may alternatively include a wheel speed sensor or other system for providing a signal indicative of the speed of vehicle 10. Hydraulic clutch control valve 68 is controlled by control circuit 64 to selectively engage and disengage PTO clutch 54 via a hydraulic conduit 69. When PTO clutch 54 is engaged, power from engine 52 is transmitted to output shaft 56. Control system 50 may further include a hydraulically-actuated or spring-actuated brake 70 to inhibit rotational motion of output shaft 56 when PTO clutch 54 is disengaged. Control system 50 includes a hydraulic valve 72 connected to brake 70 by a hydraulic conduit 74 to engage and disengage brake 70. Control circuit 64 provides control signals to valves 68, 72 (e.g., analog or digital signals, pulse-width modulated (PWM) signals, amplitude-modulated or frequency-modulated signals, or other control signals.)

Also shown in FIG. 2 is an implement 12, 30 that may be coupled to vehicle 10. Implement 12, 30 includes driven members 75 (e.g., driven member 28, driven members 34, 36) which are operated using power from engine 52 when clutch 54 is engaged. Implement 12, 30 receives power from engine 52 via drive shaft 26, 32 coupled, in this embodiment, to high speed PTO shaft 18 via a coupler 76. When PTO clutch 54 is engaged and is transmitting power from engine 52 to output shaft 56 and high speed PTO shaft 18, power is transmitted to implement drive shaft 26, 32 and to driven members 75 to perform one or more of a plurality of implement functions.

Remote PTO

According to one feature of the present invention, control circuit 64 receives remote control signals from remote PTO control switches 22, 24, a local PTO control signal from operator station-mounted PTO control switch 1, and a vehicle speed signal from vehicle speed sensor 25. In the exemplary embodiment, remote PTO switches 22, 24 each include a pair of momentary pushbuttons and are mounted on opposite sides of vehicle 10 and, preferably, on opposite sides of PTO shaft 18 (or low speed PTO shaft 60). Thus, the operator does not have to climb or reach over implement drive shaft 26, 32 when the implement is coupled to PTO shaft 18 to reach the remote control pushbuttons. Advantageously, remote PTO control switches 22, 24 are located such that operator 38 standing on the ground outside of operator station 14 has a direct view of implement drive shaft 26, 32 from either remote switch location. When vehicle speed sensor 25 indicates that vehicle 10 is travelling at or above a predetermined vehicle speed, e.g., one mile per hour (MPH), control circuit 64 prevents engagement or disengagement of PTO clutch 54 based on the remote switch signal, effectively disabling remote PTO control switches 22, 24. This feature prevents inadvertent enabling and disabling of PTO clutch 54 via remote PTO control switches 22, 24 when vehicle 10 is in motion, such as, via a twig, stalk, or worker running alongside vehicle 10. Preferably, operator station-mounted PTO control switch 1 is still enabled when vehicle 10 is travelling to allow the operator within operator station 14 to engage and disengage the PTO shaft from operator station 14.

Figure 3:
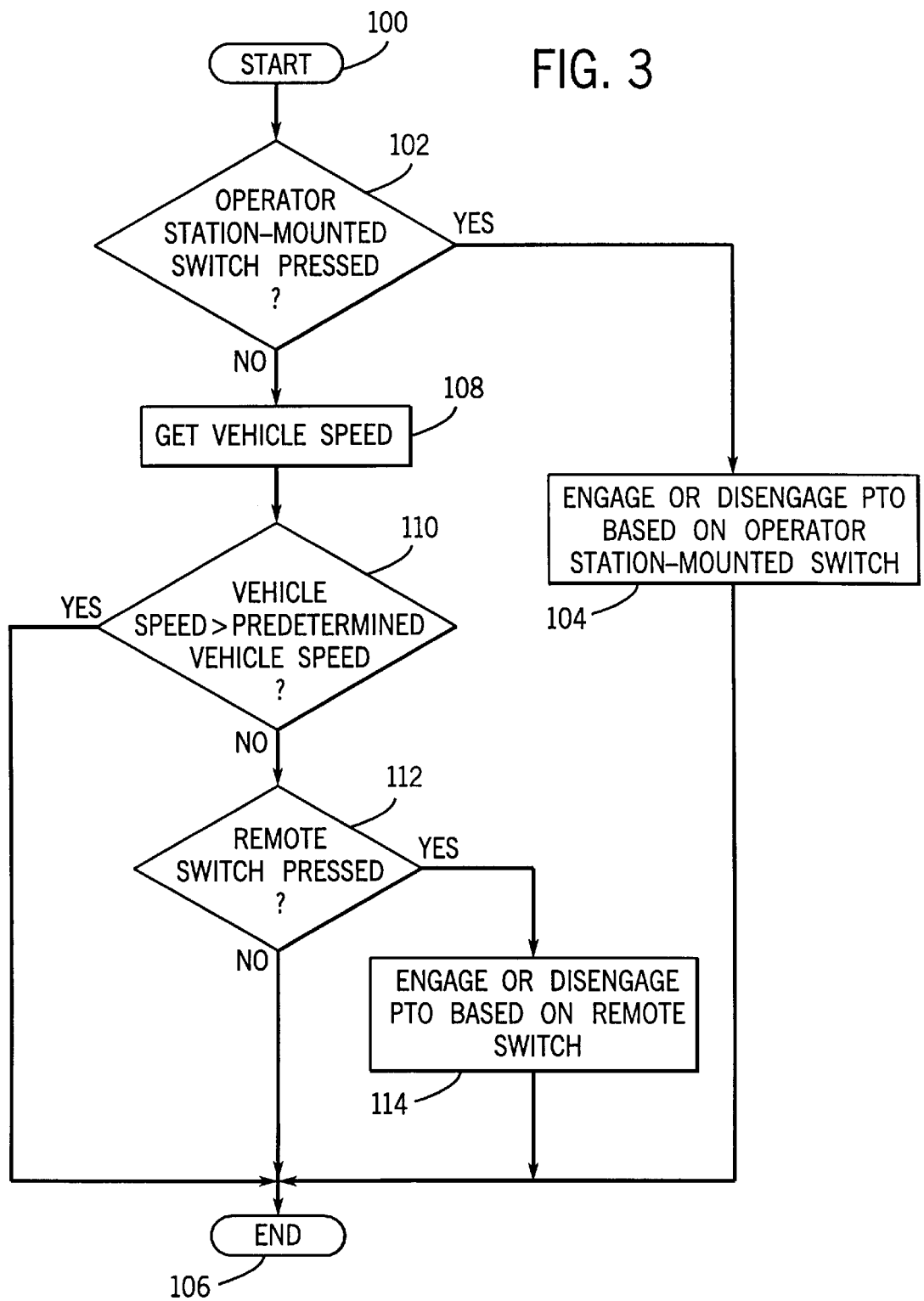
FIG. 3 is a flow chart showing the control flow of the control system of FIG. 2 according to one feature of the present invention.

A flow diagram of a control flow according to an exemplary embodiment of this feature is disclosed in FIG. 3. The routine starts at step 100. At step 102, control circuit 64 determines if a signal is being received from operator station-mounted PTO control switch 1. If so, at step 104, control circuit 64 controls engagement or disengagement of the PTO based on the signal received from operator station-mounted switch 1. Subsequently, the routine ends at step 106. If not, the control flow proceeds to step 108, to obtain a vehicle speed signal from vehicle speed sensor 25 and scale it to engineering units (e.g., miles per hour, kilometers per hour, etc.). After step 108, the flow proceeds to step 110 to test if the vehicle speed is greater than the predetermined vehicle speed. As discussed hereinbefore, this predetermined vehicle speed may be one MPH, less than one MPH, or more than one MPH (e.g., 10 MPH) and may be programmable by a service technician or preset during manufacturing. If the measured speed is greater than the predetermined vehicle speed, the control flow ends at step 106 without checking the remote PTO switches 22, 24, effectively disabling or disallowing control of the PTO based upon the remote switch signal. Alternatively, the remote switch or switches are checked at step 112. If a remote switch is pressed, the PTO shaft is engaged or disengaged based on the remote switch position or signal at step 114. The routine may begin again at step 100 and runs intermittently, selectively, or periodically throughout operation of the PTO.

Figure 4:
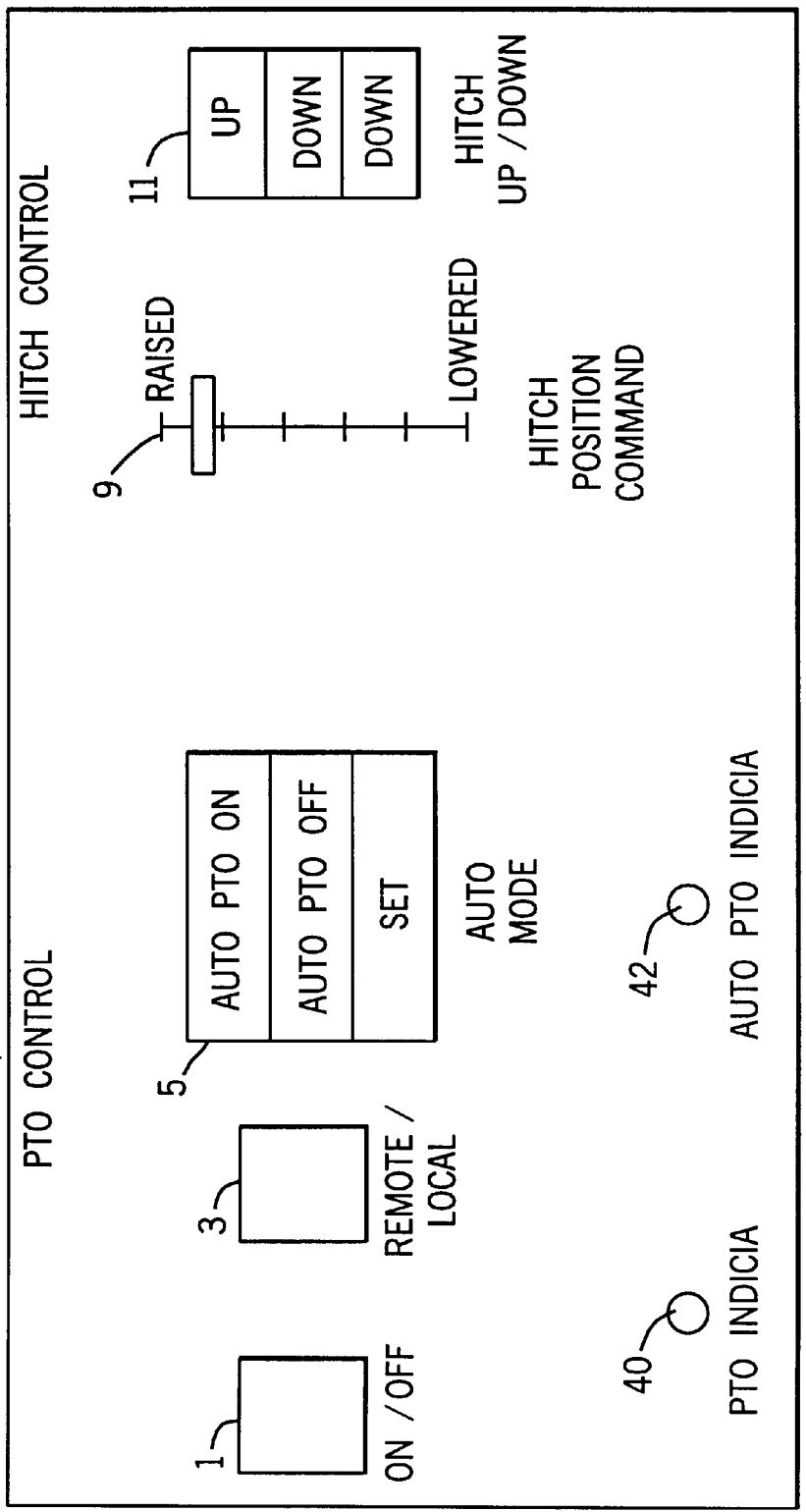
FIG. 4 is a diagram of an alternative embodiment of the exemplary operator interface unit shown in FIG. 1A.

Referring now to FIG. 4, an exemplary embodiment of operator interface unit 20 is shown with operator-adjustable switches in various exemplary configurations. Various PTO control and hitch control switch configurations may be employed to facilitate operator control of the PTO shaft and hitch position. Switches 1, 3, 5, 9, 11, 22, 23 and 24 may include any type of switch, such as, digital switches, analog switches, buttons, portions of a graphical user interface, etc., and may provide any type of control signal, such as, digital or analog signals. In this exemplary embodiment, however, switches 1 and 3 are maintained, two-position switches. Switch 1 allows the operator, while at the operator station, to manually engage or disengage the PTO shaft. Switch 3 allows the operator to select between remote PTO switch control (i.e., via remote PTO control switches 22, 24) and operator station-mounted PTO switch control (i.e., via switch 1). Switch 5 is a three-position rocker switch having an AUTO PTO OFF position (maintained), an AUTO PTO ON position (maintained) and a SET position (momentary), the function of which will be described hereinafter. Switch 9 is a slidable switch to allow the operator to set the position of the hitch relative to a maximum position and a minimum position. For example, when switch 9 is slid to a new position, control circuit 64 sends command signals to raise or lower the hitch at a predetermined speed until the selected hitch position is attained. Switch 11 is a three-position momentary switch having an UP position (maintained), a first DOWN position (maintained) and a second DOWN position (momentary). Switch 11 commands control circuit 64 to raise the hitch as long as the switch is in the UP position or until the hitch reaches the maximum hitch height position, to lower the hitch as long as the switch is in first DOWN position or until the hitch reaches the minimum hitch height position, and to drop the hitch, allowing gravity to pull the hitch to its lower-most position, when the operator actuates the second DOWN position twice in rapid succession.

In the embodiment of FIG. 4, the operator uses switch 3 to select between remote PTO switch control and operator station-mounted PTO switch control. Alternatively, switch 3 may be absent from control interface 20 and the operator may use either or both remote PTO control switches 22, 24 and operator station-mounted switch 1 at any time to control engagement and disengagement of PTO shaft 18. In the former embodiment, the operator cannot operate the PTO from the remote switches without first entering the operator station to adjust switch 3 to its REMOTE position, an inconvenience to the operator. In the latter embodiment, if operator station-mounted switch 1 is turned ON and one of remote switches 22, 24 is used to turn the PTO OFF, operator confusion may result when the operator returns to the operator station and wishes to turn the PTO ON when switch 1 is already in the ON position.

Accordingly, one advantageous modification includes the replacement of switch 1 and two-position switch 3 with a single three-position switch having a PTO OFF position (maintained), a PTO ON position (maintained) and an OFF CHANGE OF STATE position (momentary). In operation, with the vehicle being stationary, when the three-position switch is in the PTO OFF position, actuation of one of remote switches 22, 24 to the ON position will override the PTO OFF signal from the three-position switch and the controller will engage the PTO. Actuating one of remote switches 22, 24 to the OFF position will turn the PTO shaft off again. To turn off the PTO shaft from inside the operator station after having turned it on remotely, the operator moves the three-position switch to the OFF CHANGE OF STATE position momentarily, then releases it to disengage the PTO shaft. Thus, this feature allows the operator to turn off the PTO shaft from inside the operator station after it has been turned on with remote switches 22, 24 without operator confusion.

According to one embodiment, the three-position switch has a structure requiring secondary motion in order to actuate the switch to the PTO ON position For example, the three-position switch may have a button that must be pressed before the switch can be pulled upward into the PTO ON position.

Remote PTO control switches 22, 24 each include, according to one exemplary embodiment, a first ON pushbutton and a second OFF pushbutton. In order to turn the PTO on from remote switches 22, 24, control circuit 64 requires the first ON pushbutton be pressed and held for a predetermined time (e.g., about 3 seconds) before the PTO shaft will be engaged. In order to turn the PTO off from remote switches 22, 24, control circuit 64 immediately turns the PTO off when the second OFF pushbutton is pressed. Furthermore, the surface of the second OFF pushbutton is raised a slight distance (e.g., 3–4 millimeters) higher than the first ON pushbutton.

For PTO control from the operator station, the operator actuates the three-position switch to the ON position which engages the PTO shaft. As a further feature, the three-position switch can require two-motion actuation (i.e., lift and move) to prevent inadvertent engagement of the PTO shaft. The PTO shaft may then be disengaged by movement of the three-position switch to OFF or OFF CHANGE OF STATE. With the three-position switch in the ON position, the remote switches may still be used to engage and disengage the PTO shaft. Thus, this feature allows the operator to turn off the PTO shaft remotely after it has been turned on from the operator station.

As a further feature, a PTO indicia 40 (e.g., a light emitting diode or other light or sound) is present on control interface 20. PTO indicia 40 is steadily lit when the PTO is engaged from the operator station-mounted three-position switch and is turned off when the PTO is disengaged from the three-position switch. When the PTO is turned on via the three-position switch and subsequently turned off via remote switches 22, 24, PTO indicia 40 will flash, since the three-position switch is still in the ON position. To turn PTO indicia 40 off, the three-position switch must be moved to its OFF position.

According to yet another feature, control circuit 64 will disable the PTO completely if a remote PTO OFF signal is received from remote PTO control switches 22, 24 for more than a predetermined amount of time (e.g., 30 seconds), after which PTO indicia 40 will flash indicating a PTO control system error. However, if a remote PTO ON signal is received from remote PTO control switches 22, 24 for the predetermined amount of time, control circuit 64 will wait until the operator turns the PTO off either vian operator station-mounted switch 1 or via remote switches 22, 24, after which control circuit 64 will disable PTO control using via remote switches 22, 24.

Auto PTO

According to another advantageous feature of the present invention, engagement and disengagement of the PTO shaft is performed automatically by control circuit 64 when the work vehicle reaches the headland at the end of a row or re-enters the row after turning on the headland. Automatic control of the PTO shaft is based on the hitch position, as received from hitch position sensor 27, and the status of one or more operator-adjustable hitch position switches, such as, auto PTO mode switch 5. According to one exemplary embodiment, control circuit 64 includes a PTO controller to control engagement and disengagement of the PTO shaft and a hitch controller to control movement of the hitch and to sense the position of the hitch. The hitch controller provides data to the PTO controller via a data bus (e.g., RS-485 or SAE J-1939 Controller Area Network (CAN) bus), the data including the hitch position from hitch position sensor 27, the setting of hitch position command switch 9, the setting of hitch UP/DOWN switch 11, the setting of remote hitch control switch 23 and a "hitch at upper limit" status signal when the hitch has reached its maximum position. The PTO controller also receives data from operator station-mounted PTO ON/OFF control switch 1, PTO remote/local selector switch 3 and auto PTO mode switch 5.

The operator begins AUTO PTO mode by first initializing a PTO OFF setpoint and a PTO ON setpoint. The PTO ON setpoint is a hitch position below which the PTO will automatically engage when in AUTO PTO mode. The PTO OFF setpoint is a hitch position above which the PTO will automatically disengage when in AUTO PTO mode. To initialize setpoints, the operator moves the hitch to the desired setpoint and actuates auto PTO mode switch 5 to its SET position (momentary). One actuation sets the PTO OFF setpoint and two actuations sets the PTO ON setpoint. The setpoints may be initialized either with the PTO shaft rotating or with the PTO shaft stationary, the former being preferred since it will allow the operator to first identify "rattling" of the PTO shaft based on the hitch position and consequently set the setpoints to minimize this rattling when the hitch is raised and lowered at the headlands.

Next, the operator selects AUTO PTO ON (maintained) using AUTO PTO mode switch 5, PTO ON using operator station-mounted PTO ON/OFF control switch 1, and then begins traversing the field. As the operator approaches the headland, the operator raises the hitch using either hitch position command switch 9 or hitch UP/DOWN switch 11. The PTO is automatically disengaged when the hitch is raised above the PTO OFF setpoint. As the operator drives out of the headland, the operator lowers the hitch, again using either hitch position command switch 9 or hitch UP/DOWN switch 11. The PTO shaft is automatically engaged when the hitch is lowered below the PTO ON setpoint. An AUTO PTO indicia 42 (e.g., light emitting diode, buzzer, etc.) is provided on operator interface 20 to indicate when AUTO PTO mode is active. Since the PTO shaft typically takes approximately 1.5 to 2.75 seconds to engage, including two setpoints instead of one allows the operator to set the PTO ON setpoint at a higher implement position than the PTO OFF setpoint to allow the PTO shaft to be rotating at full speed before the implement is completely lowered to the ground. Other advantages and features of this flexible two setpoint system will be apparent.

The system includes further features relating to the various permutations of inputs from auto PTO mode switch 5, operator station-mounted PTO switch 1, hitch position sensor 27, etc. For example, if operator station-mounted PTO switch 1 is moved to its OFF position while auto PTO mode switch 5 is still in its AUTO PTO ON position, the PTO will be disengaged regardless of hitch position since it is presumed this is what the operator intended. As another example of such a feature, when the hitch is above the PTO OFF setpoint, operator station-mounted PTO switch 1 is in the ON position, and auto PTO mode switch 5 is moved from its AUTO PTO ON position to its AUTO PTO OFF position, PTO indicia 40 will flash and the PTO shaft will be disabled until operator station-mounted PTO switch 1 is cycled from its ON to its OFF position and back to its ON position.

The AUTO PTO mode described herein is a feature that adds significant functionality to the PTO control system of FIG. 2. However, the AUTO PTO function is only needed when the work vehicle is traveling (e.g., the application shown in FIG. 1A), not when the work vehicle is stationary (e.g., the application shown in FIG. 1B). Thus, according to another feature of the PTO control system, control circuit 64 receives a vehicle speed signal from vehicle speed sensor 25 and, when the speed is below a predetermined vehicle speed (e.g., one mile per hour or less), control circuit 64 disables the AUTO PTO function. This feature prevents inadvertent engaging and disengaging of the PTO based on the hitch position when vehicle 10 is stationary. While this feature has particular applicability when automatic engagement and disengagement of the PTO is based on hitch position, it may also find applicability when said automatic engagement and disengagement of the PTO is based on other inputs, such as, an "end of row" command received from an operator-adjustable switch or from control circuit 64 in which a plurality of end-of-row functions (e.g., control of mechanical front-wheel drive, differential lock, etc.) occurs in response to a single command.

According to one embodiment of this feature, if the operator actuates auto PTO mode switch 5 to the AUTO PTO ON position when the speed is below the predetermined vehicle speed, the AUTO PTO function will not be enabled and auto PTO indicia 42 will flash to indicate to the operator that the AUTO PTO function cannot be enabled. According to another embodiment of this feature, when in AUTO PTO mode, if the hitch is above the AUTO PTO OFF setpoint and the work vehicle 10 does not move for a predetermined period of time (e.g., 10 seconds), the AUTO PTO mode is automatically disabled and auto PTO indicia 42 flashes. Other embodiments of disabling AUTO PTO based on a vehicle speed signal are contemplated. The value of the predetermined vehicle speed may be adjustable by a service technician or programmed during manufacturing. The value is preferably sufficiently low to indicate the absence of vehicle motion in spite of the standard tolerances of vehicle speed sensor 25.

Several other features of the present control system also relate to disabling the AUTO PTO mode. According to one feature, when either of the remote PTO switches 22, 24 is actuated, AUTO PTO is disabled. According to another feature, if the hitch is above the AUTO PTO OFF setpoint and remote hitch control switch 23 is actuated, AUTO PTO is disabled. According to a further feature, if the hitch is above the AUTO PTO OFF setpoint and there is no hitch movement for a predetermined time (e.g., one minute), AUTO PTO is disabled. According to yet another feature, an operator station seat position sensor is provided to indicate whether the operator is in the seat of the operator station. The operator station seat position sensor provides a seat position signal to control circuit 64. If the operator station seat position signal indicates the operator is off the seat for more than a predetermined time (e.g., five seconds), AUTO PTO is disabled.

Figure 5:
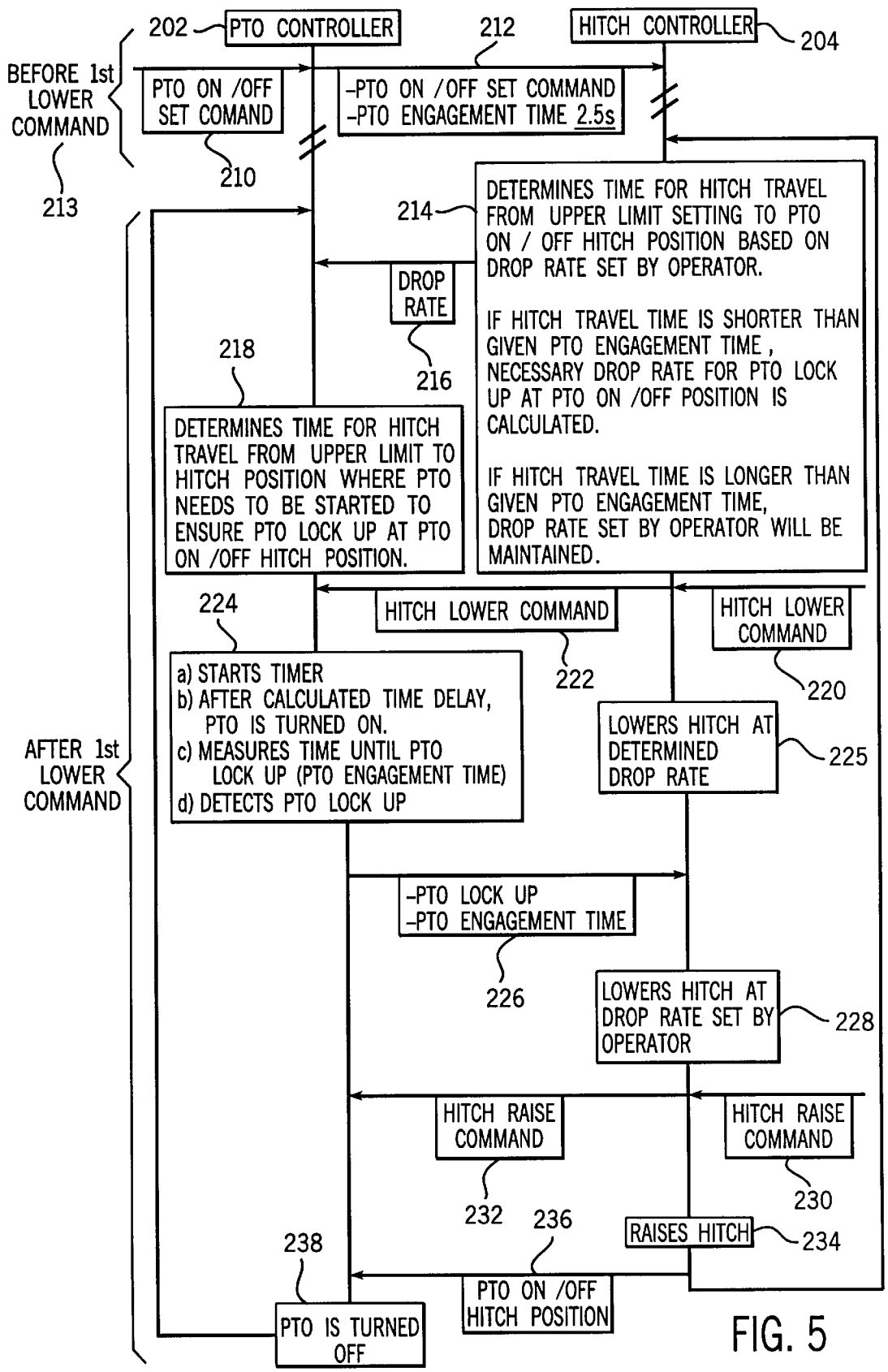
FIG. 5 is a data flow diagram showing the flow of data between a power takeoff controller and a hitch controller.

Referring now to FIG. 5, a data flow diagram shows the flow of data between a power takeoff controller and a hitch controller according to an alternative embodiment of an AUTO PTO control system. The control system includes a PTO controller 202 and a hitch controller 204 which communicate with one another via a communication link or bus, such as, an RS-485 communication link or a controller area network (CAN) bus implementing the J-1939 protocol. In this embodiment, PTO controller 202 is coupled to and is in communication with PTO ON/OFF control switch 1, auto PTO mode switch 5, remote PTO control switches 22, 24, a PTO shaft speed sensor 37, and an engine speed sensor 39. Sensors 37 and 39 assist the PTO controller in monitoring PTO clutch lockup as described below. Hitch controller 204 is coupled to and is in communication with hitch position command switch 9, hitch UP/DOWN switch 11, hitch position sensor 27 and remote hitch control switch 23. Alternatively, PTO controller 202 and hitch controller 204 could be a single controller or a portion of an engine controller or other control unit.

As indicated in FIG. 5, a PTO ON/OFF set command is generated as indicated by reference numeral 210. This set command is used to generate a hitch position setpoint, e.g., PTO ON/OFF setpoint representing a hitch position at which the PTO shaft is to be automatically engaged and disengaged. In this embodiment, the set command is sent to hitch controller 204 as indicated by reference numeral 212 and as described above with reference to the SET position of auto PTO mode switch 5. Hitch controller 204 records the position of the hitch at the time when the set command is received to generate the hitch setpoint. Alternatively, this setpoint may be pre-programmed into PTO controller 202 during manufacturing, or otherwise generated by PTO controller 202 and/or hitch controller 204.

PTO controller 202 also sends a default PTO engagement time of 2.5 seconds as indicated by reference numeral 212. This default time represents an approximation of the time between initiating PTO engagement and PTO clutch lockup, wherein torque is transmitted along the shaft. The PTO engagement time can vary from 1.5 to 2.75 seconds depending on the driven implement, viz., the mass of inertia of the implement, and other conditions. Thus, the default PTO engagement time may alternatively be 1.95 seconds, 2.5 seconds or another time period within this range of engagement times.

Throughout this application, reference is made to PTO "clutch lockup". Clutch lockup refers to a condition whereby the PTO clutch is not slipping and is transmitting sufficient torque (e.g., full torque) from the vehicle engine to drive an implement. In this exemplary embodiment, PTO controller 202 is coupled to a PTO shaft sensor (e.g., a magnetic speed pickup sensor which reads the number of teeth on a gear on the PTO shaft passing a given point over a given period of time). PTO controller 202 is also coupled to an engine speed sensor which monitors the alternator of the engine. During manufacturing, the PTO shaft is engaged at clutch lockup and the ratio of the PTO shaft sensor reading to the engine speed sensor reading is calculated. During operation, PTO controller 202 monitors this real-time ratio while filling the clutch that couples the engine to the PTO shaft until the real-time ratio is within a predetermined percentage of the previously calculated ratio. At that point, PTO controller 202 declares a "clutch lockup". While this specific embodiment of determining clutch lockup is used in the exemplary embodiment disclosed herein, the term "clutch lockup" is intended to encompass all such methods and means of determining the point in time when operational torque is transmitted from the engine to the PTO shaft. Furthermore, references to "PTO shaft engagement time" refer to the time period between initiation of PTO engagement and clutch lockup.

As indicated by reference numeral 213, the data flow indicated by reference numerals 210 and 212 occurs before the first lower command is received from the operator to lower the hitch. When a hitch lower command is first received, hitch controller 204 proceeds to step 214. At step 214, hitch controller 204 generates a hitch drop rate and a hitch upper limit setting, both of which may be pre-programmed or set by the operator via a suitable input device. The hitch upper limit setting represents the highest position at which the hitch may be positioned. The hitch upper limit setting may be the uppermost mechanical position that the hitch may attain, for example, in an embodiment where the operator cannot adjust the hitch upper limit setting. Alternatively, the current hitch position could be used in place of the hitch upper limit setting if the hitch is not at the operator-programmed or uppermost mechanical upper limit. The hitch drop rate represents the desired speed at which the hitch will drop when lowered by the operator via hitch position command switch 9 or hitch UP/DOWN switch 11. Preferably, the hitch drop rate is constant as the hitch is lowered.

Hitch controller 204 calculates a hitch drop time representing the time it will take the hitch to travel from the hitch upper limit setting to the PTO ON/OFF setpoint. The hitch drop time is calculated by subtracting the PTO ON/OFF setpoint from the hitch upper limit setting and dividing by the hitch drop rate. Hitch controller 204 then compares this hitch drop time to a second time period representative of the PTO engagement time, such as, the default PTO engagement time. If the hitch drop time is greater than the PTO engagement time, the PTO shaft will have adequate time to reach clutch lockup before the hitch reaches the PTO ON/OFF setpoint and, therefore, the drop rate of the hitch will not be altered. However, if the hitch drop time is less than the PTO engagement time, the PTO shaft will not have adequate time to reach clutch lockup before the hitch reaches the PTO ON/OFF setpoint and, therefore, the drop rate will be decreased. In this embodiment, the drop rate will be decreased to a hitch drop rate at which the power takeoff shaft will reach clutch lockup at approximately the time when the hitch crosses the PTO ON/OFF setpoint. One method of achieving this is to decrease the hitch drop rate to a rate equal to the distance between the hitch upper limit position and the hitch position setpoint divided by the PTO engagement time.

As indicated by reference numeral 216, the new hitch drop rate is sent to PTO controller 202. PTO controller 202 then generates a hitch upper limit setpoint, the PTO ON/OFF setpoint and the new hitch drop rate. The hitch upper limit setpoint and hitch drop rate are either stored in memory, received from hitch controller 204, or otherwise generated.

PTO controller 202 generates a first time period representative of the power takeoff shaft engagement time. The default PTO engagement time is generated as the first time period in the first iteration of step 218 upon power-up of the work vehicle. Subsequently, the first time period is generated by measuring as described below. PTO controller 202 then calculates a second time period based on the hitch upper limit setpoint, the PTO ON/OFF setpoint, the hitch drop rate and the first time period. The PTO controller 202 uses these values to calculate the time at which engagement of the PTO shaft is to be initiated. According to one example, PTO controller 202 subtracts the PTO ON/OFF setpoint from the hitch upper limit setpoint and divides this quantity by the new hitch drop rate. The default PTO engagement time is then subtracted from this quantity to achieve the second time period, which may be zero.

Reference numerals 220 and 222 represent the hitch lower command received by hitch controller 204 from the operator and sent to PTO controller 202, respectively. This command may be received from either hitch position command switch 9, hitch UP/DOWN switch 11, or another source. Upon receipt of the hitch lower command, PTO controller 202 starts a timer having a duration of the second time period calculated by the PTO controller, as shown in step 224, while hitch controller 204 lowers the hitch at the new hitch drop rate, as shown in step 225. The second time period may equal zero seconds. When the second time period expires, PTO controller 202 initiates engagement of the PTO shaft. PTO controller 202 then begins a lockup timer and monitors the PTO shaft to determine when the PTO shaft achieves clutch lockup. When clutch lockup is detected, the lockup timer is stopped.

As shown at reference numeral 226, the lockup timer value (approximately between 1.5 and 2.75 seconds) is then sent to hitch controller 204 along with a message indicating that the PTO shaft is fully engaged. At this point, hitch controller 204 continues to lower the hitch (i.e., from the hitch setpoint to the ground or other selected operating position) but does so at the drop rate originally received from the operator, as shown in step 228. When a hitch raise command is received, it is sent to PTO controller 202, as shown at reference numerals 230 and 232. The hitch controller raises the hitch at a predetermined hitch raising speed (step 234) until the hitch is raised above the hitch setpoint. At that point, the PTO ON/OFF setpoint is sent to PTO controller 202 as shown at reference numeral 236, at which time the PTO shaft is disengaged (step 238). The control flow returns to step 214 for hitch controller 204 and step 218 for PTO controller 202.

Note that the second time through the control flow, the default PTO engagement time of 2.5 seconds is replaced with the measured PTO engagement time of the prior hitch lower step, as generated at step 224.

While the embodiments illustrated in the FIGURES and described above are presently preferred, it should be understood that these embodiments are offered by way of example only. For example, the principles of the present invention may find applications in construction machinery as well as agricultural machinery. Also, the embodiment shown in FIG. 5 may include a second hitch setpoint, wherein the first hitch setpoint is the PTO ON setpoint and the second hitch setpoint is a PTO OFF setpoint. The invention is not limited to a particular embodiment, but extends to various modifications that nevertheless fall within the scope of the appended claims.

What is claimed is:

1. A method of controlling the engagement of a power takeoff shaft of a work vehicle having a hitch, comprising:

calculating a hitch drop time from a first hitch position to a second hitch position based on a hitch drop rate;

comparing the hitch drop time to a power takeoff shaft engagement time; and decreasing the hitch drop rate if the power takeoff shaft engagement time is greater than the hitch drop time.

2. The method of claim 1, wherein the first hitch position is a hitch upper limit setting.

3. The method of claim 1, wherein the first hitch position is a current hitch position.

4. The method of claim 1, wherein the hitch drop rate is received from the operator.

5. The method of claim 1, wherein the power takeoff shaft engagement time has a default time of approximately 2.5 seconds.

6. The method of claim 1, wherein the power takeoff shaft engagement time is calculated by:

initiating power takeoff shaft engagement;

monitoring the power takeoff shaft to determine when the power takeoff shaft reaches clutch lockup; and generating the power takeoff shaft engagement time based on the time between the step of initiating and the time when the power takeoff shaft reaches clutch lockup.

7. The method of claim 1, wherein the power takeoff shaft engagement time is representative of the time between initiating power takeoff shaft engagement and the time when the power takeoff shaft reaches clutch lockup.

8. The method of claim 1, wherein the hitch drop time is equal to the distance between the first hitch position and the second hitch position divided by the hitch drop rate.

9. The method of claim 1, wherein the hitch drop time is equal to the distance between a hitch upper limit setting and the hitch position setpoint divided by the hitch drop rate.

10. The method of claim 1, wherein the step of decreasing the hitch drop rate includes decreasing the hitch drop rate to a rate at which the power takeoff shaft will achieve lockup at approximately the time when the hitch crosses the second hitch position.

11. The method of claim 10, wherein the step of decreasing the hitch drop rate includes decreasing the hitch drop rate to a rate equal to the distance between the first hitch position and the second hitch position divided by the power takeoff shaft engagement time.

12. The method of claim 1, wherein the second hitch position is a hitch position setpoint.

13. The method of claim 12, wherein the hitch position setpoint is received from the operator.

14. The method of claim 12, wherein the hitch position setpoint is representative of a hitch position at which the power takeoff shaft is to be engaged.

15. A control system for controlling the engagement of a power takeoff shaft of a work vehicle having a hitch, comprising:
a power takeoff shaft sensor; and
a control circuit coupled to the power takeoff shaft sensor, the control circuit configured to generate a default power takeoff shaft engagement time, to initiate engagement of the power takeoff shaft, to measure a time period representing the time between initiating engagement of the power takeoff shaft and clutch lockup based on signals received from the power takeoff shaft sensor, and to generate a new power takeoff shaft engagement time based on the time period.

16. The control system of claim 15, further comprising an operator interface unit having a hitch lower switch configured to generate a hitch lower signal, the control circuit coupled to the hitch lower switch and further configured to lower the hitch when the hitch lower signal is received while the control circuit is measuring the time period.

17. The control system of claim 15, wherein the default power takeoff shaft engagement time is approximately 2.5 seconds.

18. The control system of claim 15, wherein the power takeoff shaft sensor includes a shaft speed sensor.

19. The control system of claim 15, wherein the control circuit is further configured to automatically initiate engagement of the power takeoff shaft as the hitch is lowered at a predetermined hitch drop rate at a point in time when, based on the hitch drop rate, the power takeoff shaft will reach clutch lockup approximately at a predetermined hitch position setpoint.

20. The control system of claim 15, further comprising an engine speed sensor coupled to the control circuit, the control circuit further configured to monitor signals received from the engine speed sensor to determine clutch lockup.

21. A method of controlling the engagement of a power takeoff shaft of a work vehicle having a hitch, comprising:
generating a hitch position setpoint;
generating a first time period representative of the power takeoff shaft engagement time;
generating a hitch drop rate; and
automatically initiating engagement of the power takeoff shaft based on the hitch position setpoint, the hitch drop rate and the first time period such that the power takeoff shaft achieves clutch lockup approximately at the hitch position setpoint.

22. The method of claim 21, wherein the first time period is calculated by:
initiating power takeoff shaft engagement;
monitoring the power takeoff shaft to determine when the power takeoff shaft achieves clutch lockup; and
measuring the first time period based on the time between the step of initiating and the time when the power takeoff shaft achieve lockup.

23. The method of claim 21, wherein the hitch drop rate is received in response to a setting of an operator input device.

24. The method of claim 21, wherein the first time period has a default time period.

25. The method of claim 21, further comprising generating a hitch upper limit setpoint, wherein the step of automatically initiating engagement is further based on the hitch upper limit setpoint.

26. The method of claim 25, wherein the hitch upper limit setpoint is received in response to a setting of an operator input device.

27. The method of claim 25, wherein the hitch upper limit setpoint is a mechanical upper limit of the hitch.

28. The method of claim 25, wherein the step of automatically initiating engagement of the power takeoff shaft includes subtracting the hitch position setpoint from the hitch upper limit setpoint, dividing by the hitch drop rate to generate a first quantity, subtracting the power takeoff shaft engagement time from the first quantity to achieve a second time period, and delaying the initiation of the power takeoff shaft engagement by the second time period.

29. A method of automatically controlling a power takeoff shaft of a work vehicle having a hitch, comprising automatically initiating engagement of the power takeoff shaft as the hitch is lowered such that the power takeoff shaft reaches clutch lockup approximately at a predetermined hitch position setpoint.

30. The method of claim 29, wherein the hitch is lowered at a predetermined hitch drop rate, the engagement being automatically initiated at a point in time when, based on the hitch drop rate, the power takeoff shaft will reach clutch lockup approximately at the predetermined hitch position setpoint.

31. The method of claim 29, further comprising receiving the hitch position setpoint in response to an actuation of an operator input device.

32. The method of claim 29, wherein the step of automatically initiating engagement of the power takeoff shaft includes subtracting the hitch position setpoint from a hitch upper limit setpoint, dividing by a hitch drop rate to generate a first quantity, subtracting the power takeoff shaft engagement time from the first quantity to achieve a second time period, and delaying the initiation of the power takeoff shaft engagement by the second time period.

33. The method of claim 32, wherein the hitch upper limit setpoint is received in response to a setting of an operator input device.

34. The method of claim 1, wherein the step of automatically initiating engagement of the power takeoff shaft includes subtracting the hitch position setpoint from a current hitch position, dividing by a hitch drop rate to generate a first quantity, subtracting the power takeoff shaft engagement time from the first quantity to achieve a second time period, and delaying the initiation of the power takeoff shaft engagement by the second time period.

35. The method of claim 34, wherein the hitch drop rate is received in response to a setting of an operator input device.

36. The method of claim 29, further comprising generating a power takeoff shaft engagement time.

37. The method of claim 36, wherein generating the power takeoff shaft engagement time includes:
   initiating power takeoff shaft engagement;
   monitoring the power takeoff shaft to determine when the power takeoff shaft reaches clutch lockup; and
   measuring the power takeoff shaft engagement time based on the time between the step of initiating and the time when the power takeoff shaft reaches clutch lockup.

38. The method of claim 36, wherein, as the hitch is lowered, engagement of the power takeoff shaft is initiated approximately a time period equal to the power takeoff shaft engagement time before the hitch crosses the hitch position setpoint, based on a hitch drop rate.

39. The method of claim 38, wherein the hitch drop rate is received in response to a setting of an operator input device.

40. The method of claim 38, wherein the hitch drop rate is received in response to a setting of an operator input device.

* * * * *